(12) United States Patent
Falcon et al.

(10) Patent No.: US 7,272,420 B2
(45) Date of Patent: Sep. 18, 2007

(54) MOBILE DEVICE INTERFACE AND ADAPTATION SYSTEM

(75) Inventors: Stephen Russell Falcon, Woodinville, WA (US); Jeffrey Scott Croyle, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 507 days.

(21) Appl. No.: 10/759,771

(22) Filed: Jan. 14, 2004

(65) Prior Publication Data
US 2005/0153749 A1 Jul. 14, 2005

(51) Int. Cl.
*H04M 1/00* (2006.01)
(52) U.S. Cl. ............................ 455/569.1; 455/569.2
(58) Field of Classification Search ............ 455/575.1, 455/569.1, 569.2, 556.1, 575.6; 340/539.11, 340/539.25
See application file for complete search history.

(56) References Cited

U.S. PATENT DOCUMENTS

| | | | |
|---|---|---|---|
| 5,265,238 A | 11/1993 | Canova, Jr. et al. |
| 5,333,177 A | 7/1994 | Braitberg et al. |
| 5,479,479 A | 12/1995 | Braitberg et al. |
| 5,497,490 A | 3/1996 | Harada et al. |
| 5,535,274 A | 7/1996 | Braitberg et al. |
| 5,732,074 A | 3/1998 | Spaur et al. |
| 5,751,548 A | 5/1998 | Hall et al. |
| 5,794,164 A | 8/1998 | Beckert et al. |
| 5,822,427 A | 10/1998 | Braitberg et al. |
| 5,859,762 A | 1/1999 | Clark et al. |
| 5,867,406 A | 2/1999 | Yanagisawa |

(Continued)

OTHER PUBLICATIONS

Adam Z Lein, pocketnow.com—Review—"Compaq Computer Corporation's GSM/GPRS Wireless Expansion Pack," Apr. 4, 2002, pp. 1-19, printed Oct. 11, 2002.
Christopher Spera, pocketnow.com—Review "PDA Mounts with a Twist—Arkon Resources' PDA Multimedia Mounts," Aug. 20, 2001, pp. 1-16, printed Oct. 11, 2002.
Christopher Spera, pocketnow.com—Review—"Still Rockin' Down the Highway—Arkon's iPAQ Multimedia Pedestal," Jun. 5, 2002, pp. 1-12, printed Oct. 11, 2002.
Comworxx Inc. Presents Ready-to-Ship Port-IT(TM): Voice-Activated Telephone, Dynamic Navigation and Hands-Free Information Browsing, Las Vegas, Jan. 8, 2002, pp. 1-3, printed Oct. 11, 2002.
Dan Hanttula, SemperAptus.com "The Future of the Pocket PC," pp. 1-4, printed Oct. 11, 2002.
"The importance of portability", Embedded vs. Portable Telematics, Telematices Update Magazine, Issue 21, Apr.-May 2003, pp. 19-20.

*Primary Examiner*—CongVan Tran

(57) ABSTRACT

The present invention relates to a mobile device interface and adaptation system that includes one or both of an adapter and a host device. In certain implementations, the adapter is designed to attach to a mobile device, and has one or more electrical contacts to interface with one or more electrical contacts of the mobile device when the adapter is attached to the mobile device. The adapter further has a connector portion that is electrically coupled to the one or more electrical contacts of the adapter. The host device has a connector portion that is a mate to the connector portion of the adapter. The connector portion of the host device has one or more electrical contacts to interface with one or more electrical contacts of the connector portion of the adapter when the adapter and host device are connected using the connector portions of the adapter and host device.

28 Claims, 9 Drawing Sheets

U.S. PATENT DOCUMENTS

| | | |
|---|---|---|
| 6,122,514 A | 9/2000 | Spaur et al. |
| 6,196,850 B1 | 3/2001 | Dietz et al. |
| 6,341,218 B1 | 1/2002 | Poplawsky et al. |
| 6,377,825 B1 | 4/2002 | Kennedy et al. |
| 6,430,164 B1 | 8/2002 | Jones et al. |
| 6,459,969 B1 | 10/2002 | Bates et al. |
| 6,491,194 B2 * | 12/2002 | Marvin ................... 224/483 |
| 6,516,192 B1 | 2/2003 | Spaur et al. |
| 6,633,231 B1 * | 10/2003 | Okamoto et al. ...... 340/539.11 |
| 7,072,688 B2 * | 7/2006 | Bodnar et al. ........... 455/556.2 |
| 2002/0115480 A1 * | 8/2002 | Huang ....................... 455/573 |
| 2002/0190176 A1 * | 12/2002 | Louh ....................... 248/316.4 |
| 2003/0153355 A1 * | 8/2003 | Warren ....................... 455/557 |
| 2004/0087335 A1 * | 5/2004 | Peiker ..................... 455/556.2 |

* cited by examiner

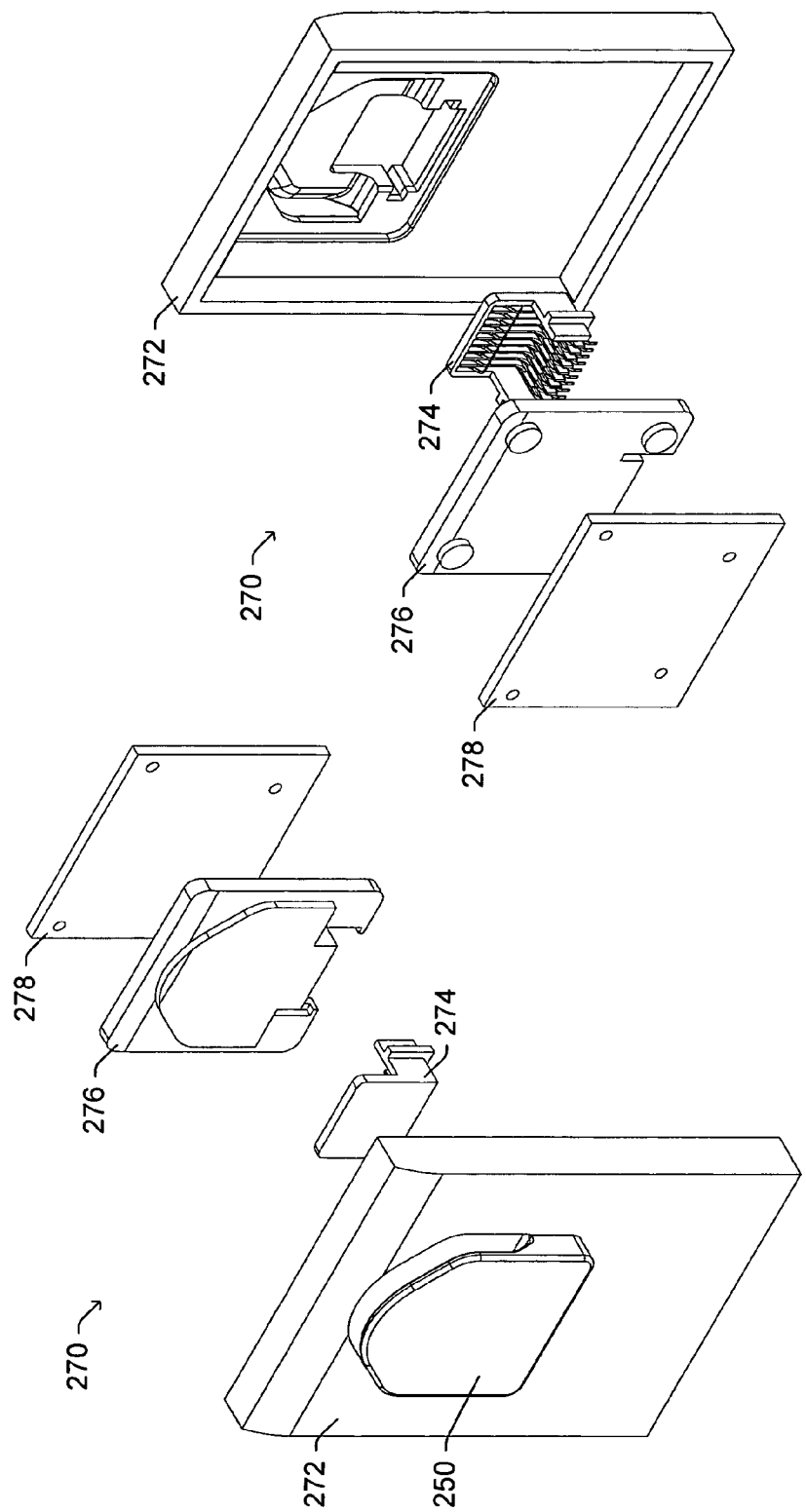

MOBILE DEVICE INTERFACE AND ADAPTATION SYSTEM

TECHNICAL FIELD

This invention relates to mobile devices, and particularly to a mobile device interface and adaptation system.

BACKGROUND

Mobile devices, such as cellular phones, personal digital audio players, handheld PCs and personal digital assistants (PDAs) have become commonplace. However, one problem encountered with such devices is how the user is to use the device in various environments. For example, it can be considered unsafe to operate a cellular phone in certain environments, such as while driving a car.

Thus, it would be beneficial to develop ways in which the functionality of mobile devices can be accessed more easily by users in various environments.

SUMMARY

A mobile device interface and adaptation system is described herein.

In accordance with certain embodiments, the system includes an adapter and/or a host device. The adapter is designed to attach to a mobile device, and has one or more electrical contacts to interface with one or more electrical contacts of the mobile device when the adapter is attached to the mobile device. The adapter further has a connector portion that is electrically coupled to the one or more electrical contacts of the adapter. The host device has a connector portion that is a mate to the connector portion of the adapter. The connector portion of the host device has one or more electrical contacts to interface with one or more electrical contacts of the connector portion of the adapter when the adapter and host device are connected.

BRIEF DESCRIPTION OF THE DRAWINGS

The same numbers are used throughout the document to reference like components and/or features.

FIGS. 9, 10, 11, 12, and 13 illustrate an example jack knife male connector assembly in additional detail.

DETAILED DESCRIPTION

A mobile device interface and adaptation system is described herein. The system includes a mobile device adapter that attaches to a mobile device, and a host device to which the mobile device adapter can be attached and securely held. The mobile device adapter allows the proprietary interface of the mobile device to be placed in communication with a standard interface of the host device. Different mobile device adapters, each being designed to communicate with the various different proprietary interfaces of different mobile devices, can be attached to the same host device as well as to different host devices in different environments.

Figure 1:
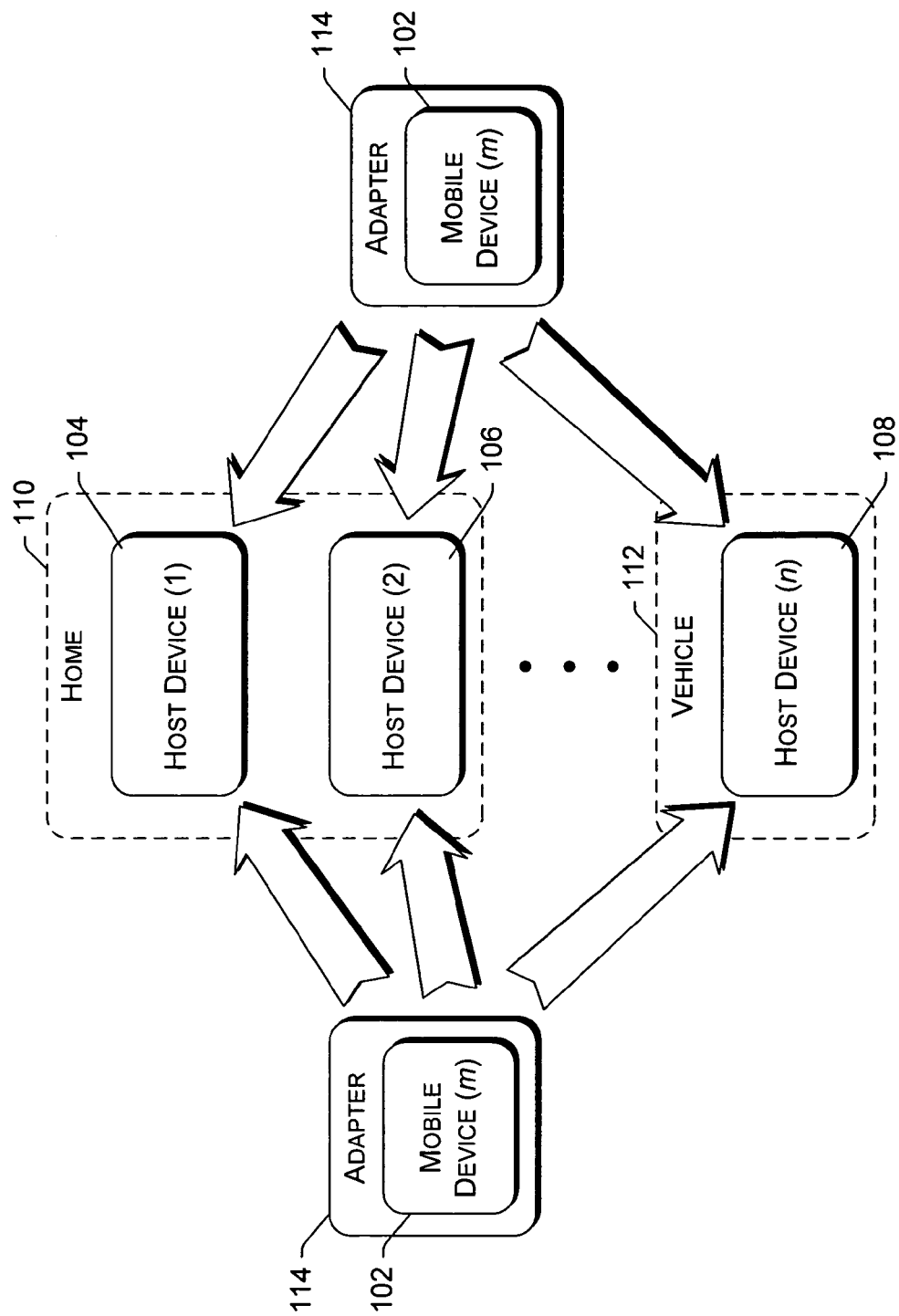
FIG. 1 is a block diagram illustrating example host devices in different environments in which a mobile device may be used.

FIG. 1 is a block diagram illustrating example host devices in different environments in which a mobile device may be used. FIG. 1 illustrates multiple (m) mobile devices 102 and multiple (n) host devices 104, 106, and 108 to which devices 102 can be attached. Host devices 104 and 106 are both in the home environment 110 and may be, for example, a home entertainment system (e.g., a radio, clock radio, stereo, television, audio and/or video recording and/or playback devices, etc.), a personal computer, a telephone, an article of clothing (e.g., a belt, armband, coat, etc.), an automation and/or security system, a refrigeration appliance (e.g., refrigerator, freezer, refrigerator/freezer combination, etc.), an oven or range, and so forth. Host device 108 is in the vehicle (e.g., car, truck, van, motorcycle, bicycle, recreational vehicle, boat, airplane, etc.) environment 112 and may be, for example, a vehicle stereo, entertainment system, or navigation system.

Mobile devices 102 can be any of a wide variety of portable devices, such as a wireless phone (e.g., a cellular phone), personal digital audio player, a handheld or pocket computer, a portable digital assistant (PDA) or organizer, and so forth. Examples of mobile devices 102 include: any of the analog or digital cellular phones available from a variety of manufacturers, such as Motorola Inc. of Schaumburg, Ill., Kyocera Wireless Corp. of San Diego, Calif., Nokia of Finland, and so forth; any of the personal digital audio players available from a variety of manufacturers, such as the iPod line of audio players available from Apple Computer, Inc. of Cupertino, Calif., any of the audio players available from Rio Audio of Santa Clara, Calif., any of the digital music players available from Dell Inc. of Austin, Tex., and so forth; any of the Treo or Visor families of communicators or organizers available from Handspring, Inc. of Mountain View, Calif.; any of the Palm handheld devices available from Palm, Inc. of Milpitas, Calif.; any of the Cassiopeia family of personal PCs available from Casio Computer Co. of Dover, N.J.; any of the CLIÉ line of handheld devices available from Sony Corporation of America New York, N.Y.; any of the Jornada or iPAQ families of pocket PCs available from Hewlett-Packard Co. of Palo Alto Calif.; any of the Axim family of handhelds available from Dell Inc. of Austin, Tex.; and so forth. It should be noted that any of a variety of off-the-shelf portable devices, such as those discussed above, can be used as mobile device 102.

Mobile devices 102 can be connected to any of host devices 104, 106, and 108 using a device adapter 114 as discussed herein. Device adapter 114 holds mobile device 102 and can be connected to one of the host devices. Device adapter 114 could be, for example, a glove or sleeve or boot, each of which is an enclosure that holds mobile device 102.

Alternatively, adapter 114 could be attached to mobile device 102 in other manners (e.g., using glue, a screw(s) or bolt(s), etc.)

Connecting mobile device 102 to a host device refers to electrically coupling the mobile device 102 with the host device. This electrical coupling allows signals to be passed between the host device and the mobile device, thereby allowing functionality (and/or data) of the host device to be made available to the mobile device, and/or allowing functionality (and/or data) of the mobile device to be made available to the host device. This connecting of the mobile device 102 to a host device can also be referred to as the host device hosting the mobile device adapter 114, and thus also hosting the mobile device 102.

Although discussed herein primarily as an electrical coupling, connecting mobile device 102 to a host device may also refer to other types of couplings. For example, an optical coupling may be used, with adapter 114 allowing signals to be passed optically between adapter 114 and mobile device 102. Adapter 114 may route these signals optically to the host device (e.g., using fiber optic wires), or alternatively adapter 114 may convert optical signals received from mobile device 102 (e.g., from an infrared (IR) port of mobile device 102) into electrical signals to be routed to the host device and convert electrical signals received from the host device into optical signals to be transmitted to mobile device 102 (e.g., to an IR port of mobile device 102).

Figure 2:
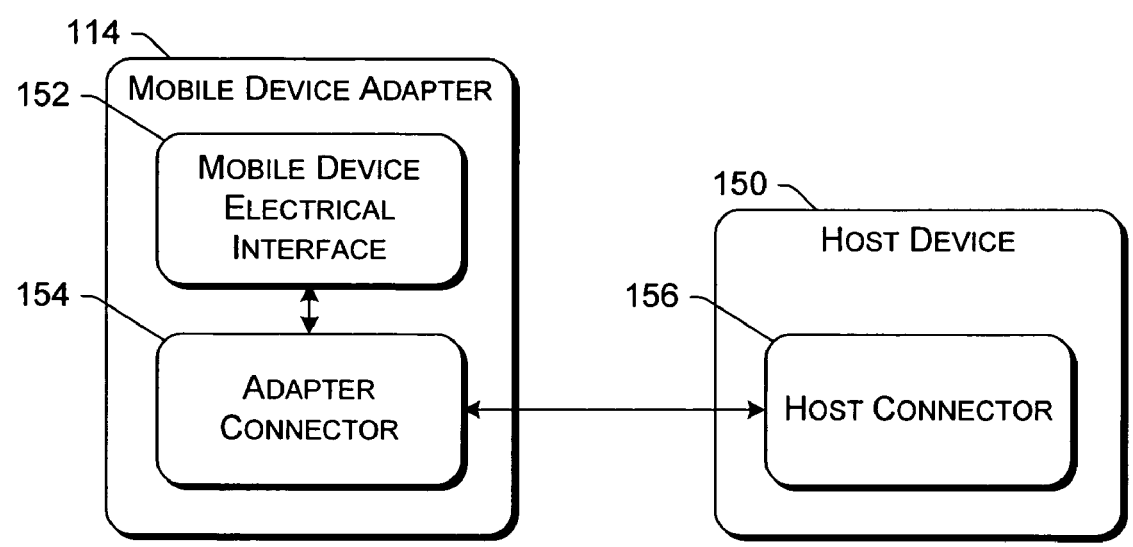
FIG. 2 illustrates an example mobile device adapter and host device in additional detail.

FIG. 2 illustrates an example mobile device adapter 114 and host device 150 in additional detail. Host device 150 can be, for example, any of the host devices 104, 106, and 108 of FIG. 1.

Mobile device adapter 114 includes a mobile device electrical interface 152 and an adapter connector 154. Mobile device electrical interface 152 allows the electrical contacts of the mobile device (not shown) to be in contact with adapter 114. Adapter 114 is designed so that interface 152 is configured in such a way as to allow contact with whatever electrical contacts are exposed by the mobile device.

Adapter connector 154 allows mobile device adapter 114 to be connected to a host connector 156 of host device 150. Adapter connector 154 is in electrical communication with mobile device electrical interface 152. For example, adapter 114 may include one or more wires that connect interface 152 to connector 154.

Once connected to host connector 156, adapter connector 154 and host connector 156 are physically coupled to one another and also electrically coupled to one another. This coupling of adapter 114 and host device 150 thus allows electrical signals to be communicated between host device 150 and mobile device adapter 114. Further, as mobile device electrical interface 152 is in electrical communication with the mobile device, this coupling of adapter 114 and host device 150 further allows electrical signals to be communicated between host device 150 and the mobile device. The physical coupling of host connector 156 and adapter connector 154 allows adapter 114 (and thus the mobile device) to be securely held in the environment where host connector 156 is located. For example, the mobile device can be securely held in a vehicle while the vehicle is moving so that the device does not fall or drop.

The ability to communicate electrical signals between the mobile device and host device 150 allows data and/or instructions to be communicated between the mobile device and host device 150. Host device 150 itself may include additional functionality that is made available to the mobile device, or alternatively that avails itself of data and/or functionality of the mobile device. For example, host device 150 may be a stereo that can retrieve song files (e.g., in the WMA or MP3 formats) from the mobile device and play the songs through speakers of host device 150. Alternatively, host device 150 may simply be a conduit for communicating signals between the mobile device and another device. For example, host device 150 may be an adapter for a car that routes signals received from the mobile device to a car stereo, and routes signals received from the car stereo to the mobile device.

In addition to allowing host device 150 and the mobile device to communicate with one another (e.g., sending instructions and/or data between one another), the coupling may also allow power to be transmitted from one to the other (typically from the host device to the mobile device). For example, the mobile device could be powered from host device 150, thereby reducing the power drain on the battery (or batteries) in the mobile device. By way of another example, the battery (or batteries) of the mobile device could be at least partially re-charged by power from host device 150. In such embodiments, where the mobile device receives power from host device 150, interface 152 includes a contact(s) that allows power received from host device 150 (by way of connector 154 and optionally wiring in adapter 114) to be supplied to the mobile device.

Adapter connector 154 and host connector 156 can take a variety of different forms, but are designed to allow for the electrical and physical coupling or attachment of adapter 114 to host device 150. The connectors 154 and 156 are designed as mates to one another, typically allowing a user to easily attach adapter 114 to host device 150.

In certain embodiments, the connectors 154 and 156 integrate the electrical and physical coupling into a single mated pair of connectors (e.g., a "jack knife" design, as discussed below). By using a single mated pair of connectors, separate connectors for the electrical coupling and the physical coupling are not needed (e.g., a need for one set of connectors to create the electrical coupling and a second set of connectors to create the physical coupling can be avoided). Furthermore, no cable need be plugged into the mobile device, adapter 114, or host device 150 in order for electrical signals to be communicated between the mobile device and host device 150.

As an example, the connectors 154 and 156 employ a "jack knife" design, where one of the two connectors 154 or 156 is a blade while the other of the two connectors 154 or 156 is a slot (or sheath), and where the blade and slot are designed so that the blade slides easily (but typically snugly) into the slot. Electrical contacts are exposed on the outer surface of the blade as well as within the slot, so that when the blade is inserted into the slot the electrical contacts exposed by the blade and slot are in contact with one another. The thickness of the blade can vary depending on the anticipated weight of the mobile device and the materials used. Typically, thinner blades are used to reduce weight and bulk of the adapter 114, and the blades may have sharp and/or rounded edges. The blade may also be tapered, being thinner and/or narrower at one end (the exposed end that is first to be inserted into the slot) and thicker and/or wider at the other end to allow for easier insertion of the blade into the slot. This jack knife design allows for a "slip-on" or "slide-on" configuration where the user can easily slip or slide the adapter onto the host device. This slipping or sliding motion is typically performed in a plane that is approximately parallel to a plane of the back of the adapter.

Alternatively, other designs could be employed. For example, rather than a slip-on or slide-on design, a "pushon" design could be used. Using a push on design, one of the two connectors 154 and 156 is a protrusion while the other of the two connectors 154 and 156 is a receptacle. The user can easily push the adapter onto the host device (e.g., the pushing motion is typically performed in a plane that is approximately perpendicular to a plane of the back of the adapter). By way of another example, the host device may be configured as a cradle that the adapter slips into. This cradle could be analogous to, for example, current docking stations or cradles for mobile devices. However, in this example the cradle includes one or more electrical contacts that are in electrical communication with contacts of the adapter when the adapter is slid into the cradle.

In certain embodiments, connectors 154 and 156 are designed to support easy "blind insertion" for the user. Easy blind insertion refers to the user being able to easily couple the mobile device 102 and adapter 114 assembly to host device 150. Easy blind insertion can provide for a better user experience. For example, the user can quickly and easily couple the mobile device and adapter assembly to the host device without looking (e.g., by touch) and/or with just a brief glance. A specific example is the jack knife design discussed herein—it is quick and easy for the user to slip the mobile device and adapter assembly onto the host device. Additionally, depending on the environment and design, gravity may be used to assist in this mounting process (e.g., the user can "drop" the mobile device and adapter assembly onto the host device connector, relying on gravity to finish the coupling process by pulling the mobile device and adapter assembly onto the host device connector).

As can be seen from FIG. 2, a mobile device adapter 114 is designed to the particular features (e.g., size, shape, and manner in which electrical contacts are exposed) of a particular one or more mobile devices. Additionally, the mobile device adapter 114 is further designed to be coupled to the standard connector of the host device. Thus, mobile device adapter 114 can be seen as an adapter that allows the proprietary interface of the mobile device to be placed in communication with the standard interface of the host device, while at the same time providing physical support to the mobile device. The host device is designed to remain the same without regard for the particular mobile device; rather, it is the mobile device adapter 114 that is different for different mobile devices. Additionally, multiple host devices in multiple environments (e.g., different vehicles) can be coupled to the same adapter 114 (at different times).

Adapter 114 is also designed so as to not hinder or impede the normal operation of the mobile device. Holes or openings may be present in adapter 114 to allow buttons, switches, or other interface mechanisms to be exposed to the user. Alternatively, portions of adapter 114 may cover interface mechanisms but still allow the interface mechanisms to be used by the user (e.g., a clear plastic covering over a display, or a covering over a button that allows the user to press the button by pressing on the covering).

Such a design for adapter 114 allows adapter 114 to remain continually attached to the mobile device, even when adapter 114 is not attached to host device 150 (e.g., when the mobile device is being carried by a user in his or her pocket, or is set on a desktop or tabletop by the user). It should be noted that some uses of the mobile device may require adapter 114 to be removed. For example, in certain implementations adapter 114 may need to be removed from the mobile device before a battery of the mobile device can be replaced. However, adapter 114 does not interfere with the regular day-to-day operation or functionality of the mobile device.

Figure 3:
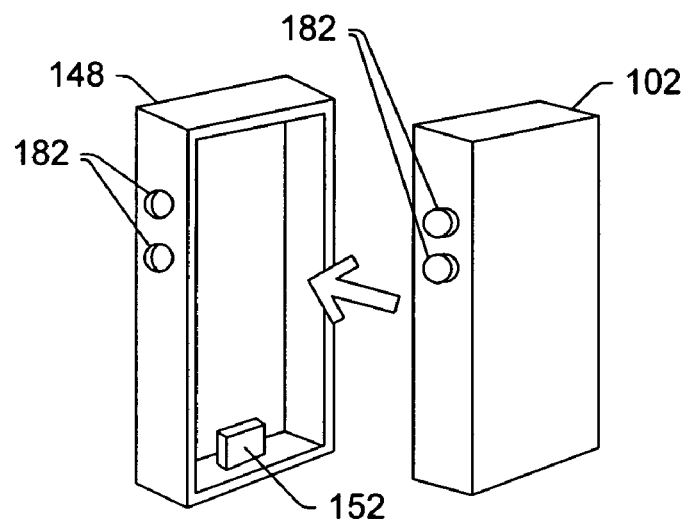
FIG. 3 illustrates an example mobile device and adapter in additional detail.
Figure 4:
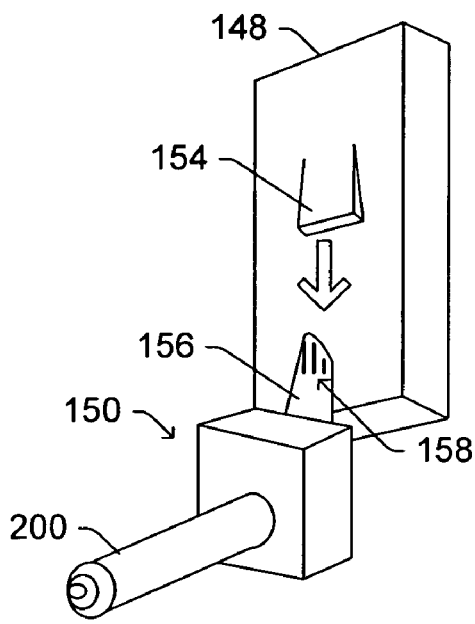
FIG. 4 illustrates an example host device and adapter in additional detail.

FIG. 3 illustrates an example mobile device and adapter in additional detail. In the example of FIGS. 3 and 4, the adapter 114 of FIG. 2 is a glove 148. As illustrated in FIG. 3, glove 148 includes an electrical interface 152 that can be placed in contact with the contacts of mobile device 102 (on the bottom or back of device 102, not shown in FIG. 3).

Glove 148 is designed to encase mobile device 102, allowing glove 148 to be securely fit to device 102. Glove 148 may optionally be made of a semi-flexible or elastic material that can be stretched around the device 102, or alternatively another mechanism for securing glove 148 to device 102 may be used.

Glove 148 is also designed so as to not hinder or impede the normal operation of mobile device 102. As illustrated in FIG. 3, holes 180 in glove 148 allow buttons 182 of mobile device 102 to be exposed to the user when glove 148 is secured to device 102. Glove 148 can thus remain continually attached to mobile device 102, even when glove 148 is not attached to host device 150 (e.g., when mobile device 102 is being carried by a user in his or her pocket). It should be noted that some uses of mobile device 102 may require glove 148 to be removed. For example, in certain implementations glove 148 may need to be removed from device 102 before a battery of device 102 can be replaced.

The back side of glove 148 of FIG. 3 is illustrated in FIG. 4, along with a host device 150. In the example of FIG. 4, host device 150 is designed to be a lighter adapter with a portion 200 that plugs into a standard cigarette lighter jack or power jack of a vehicle.

Host device 150 also includes a host connector 156 that is a jack knife male connector. Glove 148 includes a glove connector 154 that is a jack knife female connector, which readily slides onto jack knife male connector 156. Electrical contacts 158 on host connector 156 are positioned to be in electrical communication with corresponding electrical contacts within glove connector 154 (not shown) when connector 154 is slid onto connector 156.

In the example illustrated in FIG. 4, glove connector 154 is designed to be fixed and always protruding from the back of glove 148. Alternatively, glove connector 154 could be designed to "flip-out" from glove 148 when needed, and be pushed back in when glove 148 is not attached to host device 150 so that the outermost part of connector 154 is approximately flush with the back of glove 148.

The interface and adaptation system described herein results in a very user-friendly system. As host device 150 includes a standard interface via connector 156, the user can readily use multiple different mobile devices (each of which may have its own proprietary electrical interface) with host device 150 simply by securing a different adapter 114 to each of the different mobile devices. As these different adapters are designed to establish electrical contact with the various different interfaces of the different mobile devices, host device 150 need not be concerned with these different interfaces. Additionally, as adapter 114 can be continually attached to the mobile device, adapter 114 can further provide additional protection to the mobile device (e.g., protection against scratches and at least some cushioning in the event the device is hit by another device or dropped).

FIGS. 5-16 illustrate additional examples of a mobile device, adapter, and/or host device. In the examples of FIGS. 5-16, adapter 114 of FIG. 2 is a boot 218. Boot 218 is designed to encase mobile device 102, allowing boot 218 to be securely fit to device 102. Boot 218 may optionally be made of a semi-flexible or elastic material that can be stretched around the device 102, or alternatively another mechanism for securing boot 218 to device 102 may be used.

Figure 5:
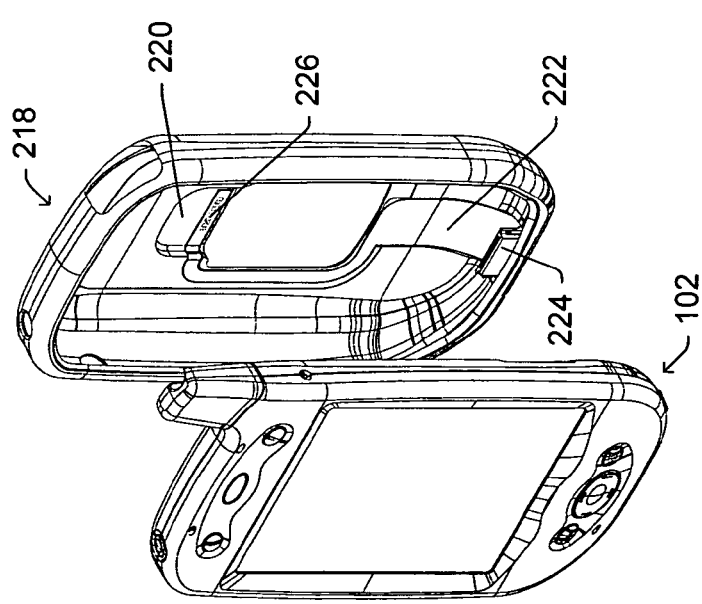

Boot 218 is also designed so as to not hinder or impede the normal operation of mobile device 102. As illustrated in FIG. 5, the front face of mobile device 102 is exposed to the user when boot 218 is secured to device 102. Boot 218 can thus remain continually attached to mobile device 102, even when boot 218 is not attached to host device 150 (e.g., when mobile device 102 is being carried by a user in his or her pocket). It should be noted that some uses of mobile device 102 may require boot 218 to be removed. For example, in certain implementations boot 218 may need to be removed from device 102 before a battery of device 102 can be replaced.

Similar to the example of FIGS. 3 and 4, boot 218 includes a boot connector 220 that is a jack knife female connector. As illustrated in the drawings, the connector 220 is formed by parts of boot 218 as well as the back side of mobile device 102. The connector 220 is designed to readily slide onto a jack knife male connector of the host device (not shown in FIG. 5).

A flex circuit 222 is mounted on boot 218 to provide electrical communication between mobile device 102 and the contacts of host connector 156 when the adapter/mobile device assembly is attached to host device 150. Flex circuit 222 includes electrical contacts (not shown) within a mobile device docking connector 224, the connector 224 operating as mobile device electrical interface 152 of FIG. 2. When boot 218 is affixed to mobile device 102, docking connector 224 is inserted into an opening in mobile device 102. When connector 224 is inserted into mobile device 102, the electrical contacts within mobile device docking connector 224 are placed in contact with electrical contacts of mobile device 102, allowing electrical signals to be communicated between mobile device 102 and flex circuit 222. Flex circuit 222 also includes electrical contacts 226 to allow electrical signals to be communicated between flex circuit 222 and a host connector 156 of a host device (not shown in FIG. 5). The electrical contacts within docking connector 224 and the electrical contacts 226 are in electrical communication with one another by way of flex circuit 222, allowing electrical signals to be communicated between contacts 226 and the contacts within docking connector 224. For example, flex circuit 222 may include one or more wires that are routed from contacts 226 to the contacts within docking connector 224, these wires allowing electrical signals to be passed between the contacts.

Figure 6:
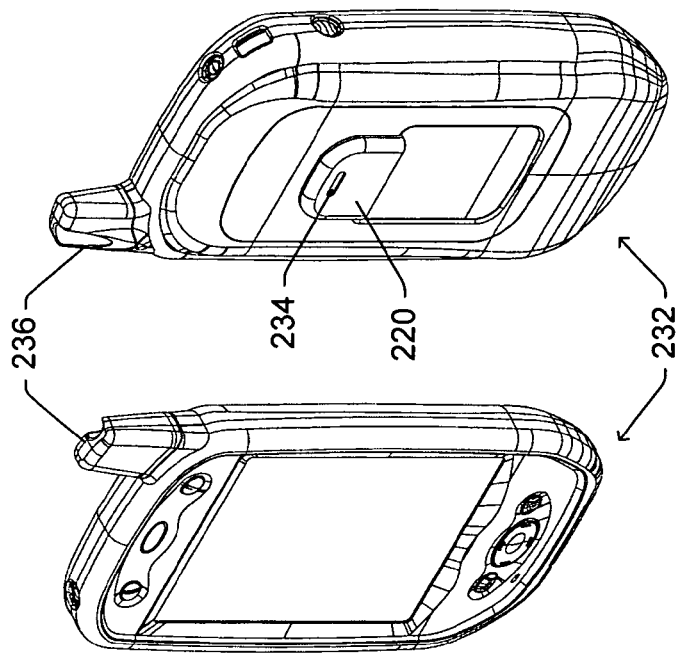
FIGS. 5 and 6 illustrate another example mobile device and adapter in additional detail.

FIG. 6 illustrates an adapter/mobile device assembly 232 which results from mobile device 102 of FIG. 5 being inserted into boot 218 of FIG. 5. The left-hand side of FIG. 6 shows the front of assembly 232, with various controls of mobile device 102 being exposed to the user. The right-hand side of FIG. 6 shows the back of assembly 232, with the back of connector 220 being shown. A detent or dimple 234 is shown on the back of connector 220. Dimple 234 allows a protrusion, such as a spring-loaded ball, from the jack knife male connector of the host device (not shown in FIG. 6) to be extended into connector 220 and thus "caught" by connector 220, assisting in having the adapter/mobile device assembly 232 securely held by the host device.

Also as illustrated in FIG. 6, an antenna 236 of mobile device 102 extends through an opening in boot 218, and various additional openings along the side of boot 218 allow controls and/or input/output (I/O) components of mobile device 102 to be exposed to the user (e.g., a microphone or headset jack, an Infrared (IR) port, one or more switches, etc.).

Figure 7:
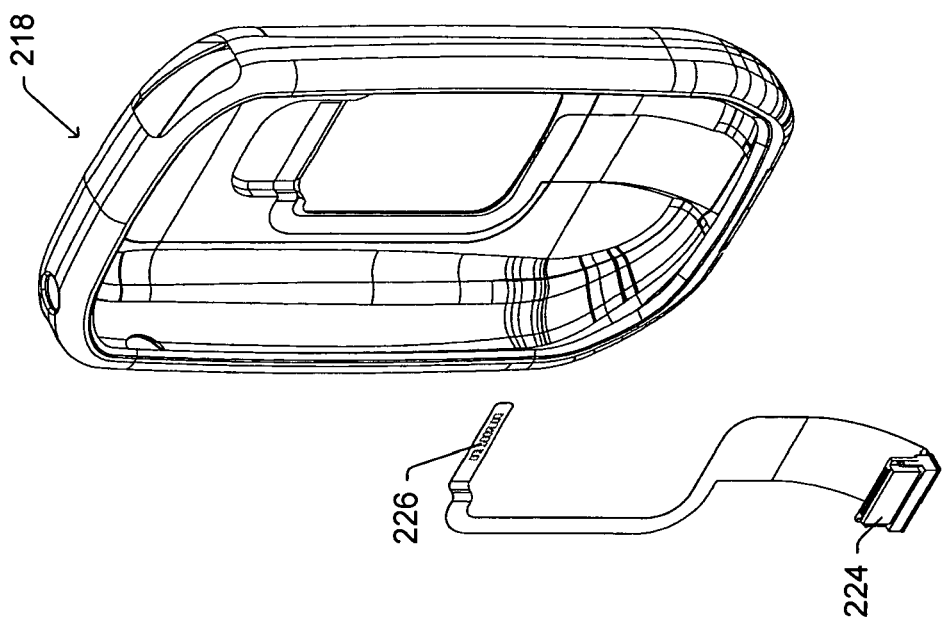
FIG. 7 illustrates another example adapter in additional detail.

FIG. 7 illustrates an alternative view of boot 218 and flex circuit 222. Boot 218 and flex circuit 222 are manufactured as two separate components, and designed so that flex circuit 222 can be mounted to boot 218. Flex circuit 222 can be mounted to boot 218 in any of a variety of manners, and in certain embodiments the mounting is designed to be permanent. For example, flex circuit 222 may be glued to boot 218 using any of a variety of adhesive compounds.

Figure 8:
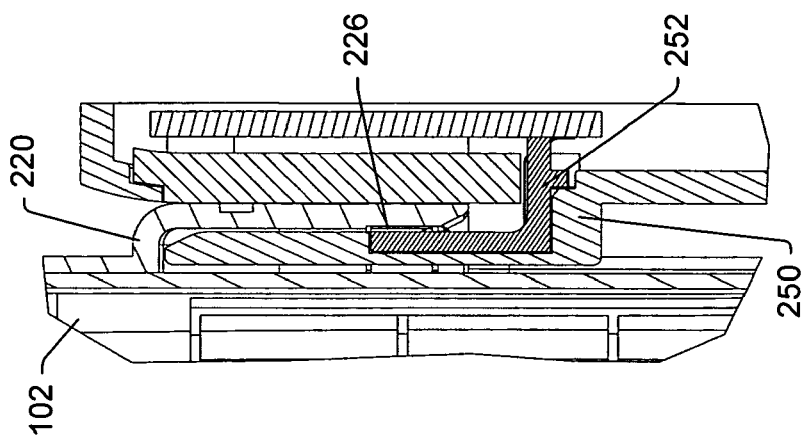
FIG. 8 illustrates an example of jack knife male and female connectors when coupled together.

FIG. 8 illustrates an example of the jack knife male and female connectors when physically coupled together. The jack knife female connector 220 on a mobile device 102 (only part of mobile device 102 is shown in FIG. 8) with electrical contacts 226 is shown. The jack knife male connector 250 on a host device 150 (only part of host device 150 is shown in FIG. 8) with a connector sub-assembly 252 is also shown. As can be seen from FIG. 8, when the jack knife male and female connectors are connected together, the electrical contacts 226 of female connector 220 are in contact with contacts of connector 252 of male connector 250.

FIGS. 9-13 illustrate an example jack knife male connector assembly 270 in additional detail. Jack knife male connector assembly 270 includes a front housing 272, a connector sub-assembly 274 (e.g., sub-assembly 252 of FIG. 8), a plug 276, and a back plate 278. Connector assembly 270 is created by inserting connector sub-assembly 274 into housing 272, and placing plug 276 behind sub-assembly 274 to plug the opening left behind housing 272. Back plate 278 is then securely mounted to housing 272 keeping plug 276 and sub-assembly 274 in place. Alternatively, plug 276 and back plate 278 may be combined into a single component. The secure mounting of back plate 278 to housing 272 can take any of a variety of forms, such as using glue or other adhesive, using screws or bolts, and so forth. Back plate 278 also provides for electrical connection between connector sub-assembly 274 and the remainder of host device 150. Back plate 278 may be, for example, a printed circuit board (PCB).

Figure 13:
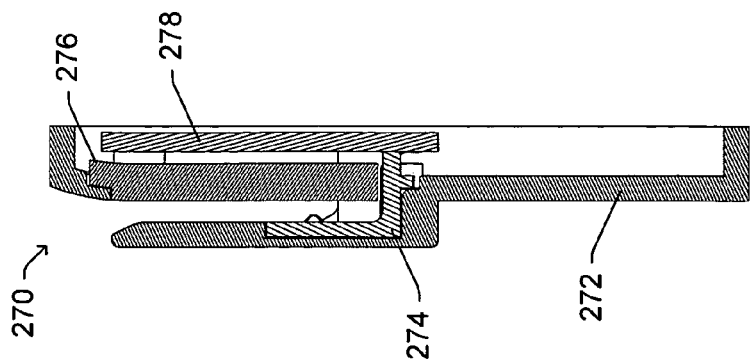
Figure 12:
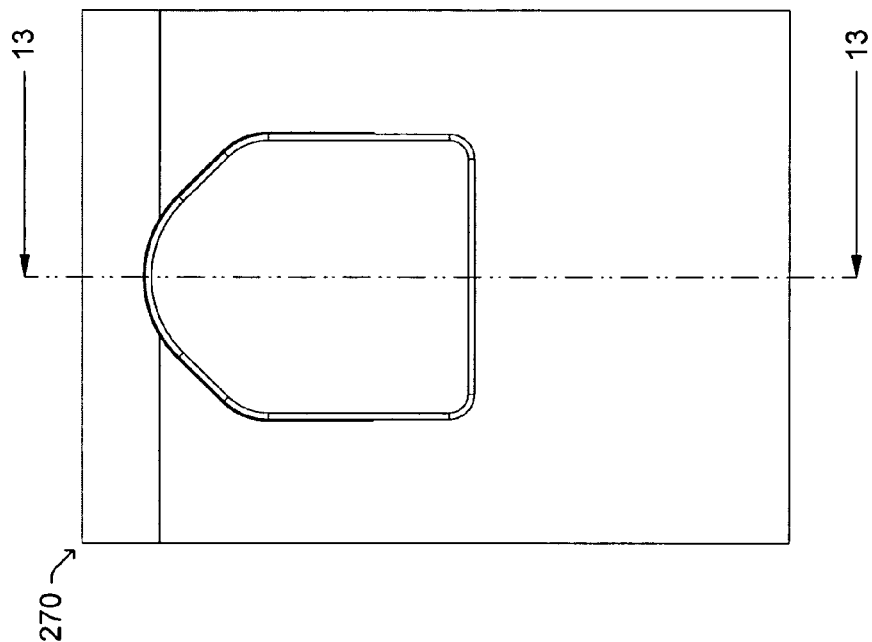
Figure 11:
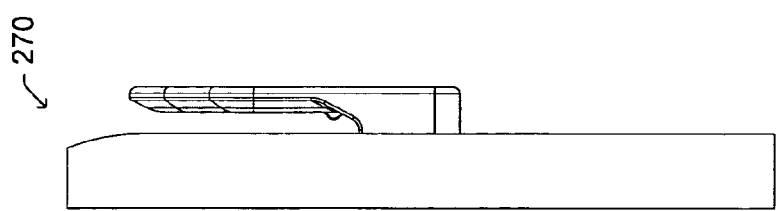

These four pieces 272, 274, 276, and 278, when coupled together, form connector assembly 270 as shown in FIGS. 11-13. FIG. 11 is a side view of connector assembly 270, while FIG. 12 is a front view of connector assembly 270. FIG. 13 is a section view of connector assembly 270, viewed along section lines 13 of FIG. 12.

Having connector assembly 270 constructed from multiple components can facilitate the manufacturing and design process for the host device. For example, male connector 250 and connector sub-assembly 274 can be manufactured by two different companies, and subsequently assembled. This alleviates the host device manufacturer (e.g., which manufactures housing 272) of the burden of design and manufacture of the electrical connector (sub-assembly 274), while also alleviating the connector sub-assembly manufacturer (which manufactures sub-assembly 274) of the burden of design and manufacture of the remainder of the host device.

Figure 16:
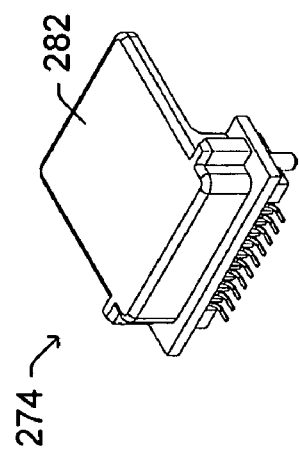
FIGS. 14, 15, and 16 illustrate a connector sub-assembly in additional detail.
Figure 15:
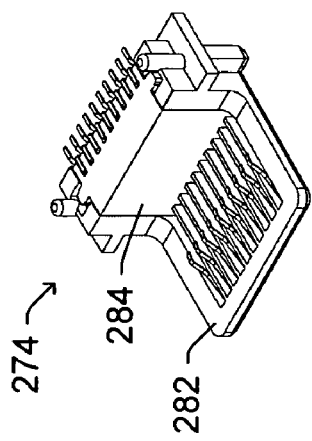
Figure 14:
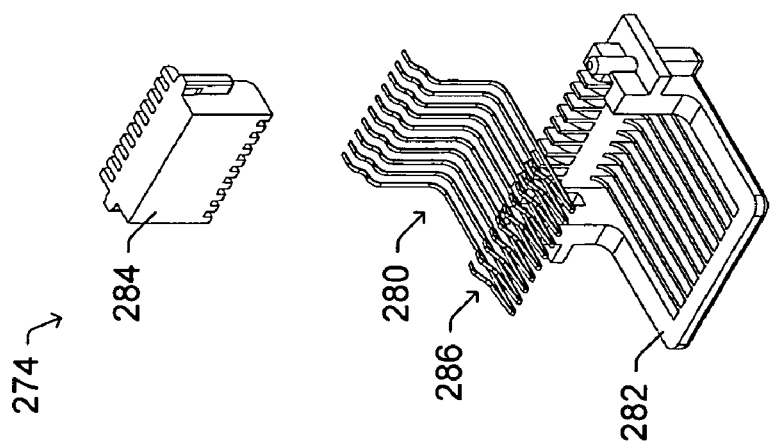

FIGS. 14, 15, and 16 illustrate connector sub-assembly 274 in additional detail. As shown in FIG. 14, connector sub-assembly 274 includes wires 280 that are placed in a housing 282 and secured in place by a cover 284. Wires 280 are exposed at either end so that they may be placed in contact with electrical contacts of an adapter connector 154 inserted into host connector 156, as well as in electrical contact with other portions of the host device (e.g., back plate 278 of FIGS. 9-13). In the illustrated example of FIGS. 14-16, the wires 280 at one end 286 are folded back on themselves and protrude in order to assist in making the electrical contact. The wires 280 at one end 286 will, for example, be placed in contact with electrical contacts 226 of flex circuit 222 discussed above when the adapter/mobile device assembly is being held by the host device. Cover 284 can be held securely in place in housing 282 in any of a variety of different manners, such as by use of adhesive materials (e.g., glue), a protrusion on cover 284 which extends into a detent on housing 282, screws or bolts, and so forth.

FIGS. 15 and 16 illustrate bottom and top views, respectively, of connector sub-assembly 274 when assembled. As shown, the ends of wires 280 are exposed to allow for the electrical connections.

Returning to FIG. 2, mobile device adapter 114 is designed to be securely attached to the mobile device. This secure attachment refers to the adapter remaining in contact with the electrical contacts of the mobile device during normal handling and operation of the mobile device (regardless of whether the adapter is attached to a host device). Although mobile device adapter 114 is securely attached to the mobile device, adapter 114 is typically not permanently attached and can typically be removed by the user.

This secure attachment can be achieved in any of a variety of different manners. For example, adapter 114 can be made of a semi-flexible or elastic material that can be stretched around the mobile device. By way of another example, a mechanical locking mechanism may be used (such as a latch or clasp, a protrusion on the adapter (or alternatively the mobile device) that slips into a detent on the mobile device (or alternatively the adapter) and must be pushed at least partially out of the detent before the adapter can be removed, and so forth) to secure adapter 114 to the mobile device.

Generally, the mobile device adapter 114 has the following properties:

- exposes buttons, infrared (IR) ports, and/or other input mechanisms as well as optionally output mechanisms of the mobile device (the adapter 114 does not hinder or impede the normal operation of mobile device);
- holds the mobile device electrical interface in place (in contact with the corresponding contacts of the mobile device);
- holds a standard connector (e.g., on the back of the device) for connecting to host devices;
- optionally provides damage protection against the mobile device being dropped or otherwise hit or scratched;
- optionally provides stylish finish and/or user-customization to the device.

Mobile device electrical interface 152 is typically on the inside of adapter 114 and, when adapter 114 is secured to the mobile device, interface 152 is placed 11 in electrical contact with contacts of the mobile device, allowing signals to be transmitted between adapter 114 and the mobile device. Any of a variety of mechanisms can be used to place the electrical contact(s) of the mobile device into contact with the electrical contact(s) of interface 152. For example, the electrical contacts on the device and/or the adapter may be flexible or spring-loaded, and designed to extend outward from the device and/or the adapter; these contacts are then compressed by the electrical contacts of the other of the device or adapter when the device and adapter are attached. Alternatively, the electrical contact(s) of one of the device and adapter may be a protrusion while the other is a receptacle into which the protrusions can be plugged and the electrical contact made (e.g., analogous to a conventional electrical wall socket). Alternatively, the electrical contacts on both the device and the adapter may be flat surfaces that are approximately parallel to, and touching, one another when the device and adapter are attached.

The interface 152 is electrically coupled to adapter connector 154, so that electrical signals received from the contacts or interface of the mobile device can be routed to adapter connector 154, and similarly so that electrical signals received from the adapter connector 154 can be routed to the contacts or interface of the mobile device. Additionally, one or more contacts of interface 152 may be used to route power to the mobile device.

Generally, the mobile device electrical interface 152 has the following properties:

- accesses the necessary electrical interfaces or contacts of the mobile device;
- routes those signals via wire/traces to the standard adapter connector 154.

Adapter connector 154 allows adapter 114 to be electrically and physically coupled to host device 150. Adapter connector 154 is typically on the back of adapter 114 (e.g., as illustrated in the example of FIG. 4), although other placements may alternatively be used (e.g., on a side of adapter 114, on the bottom of adapter 114, on the top of adapter 114, one or more of these locations, and so forth). A locking mechanism may optionally be included to allow the connectors 154 and 156 to be held together more securely. For example, a protrusion on one of the connectors may slide into a detent on the other of the connectors. By way of another example, a latch may be used that requires the user to press or squeeze a release mechanism before the connectors can be separated. By way of yet another example, a spring-loaded ball (or other protrusion) on one of the connectors may extend into a dimple (or other opening) on the other of the connectors.

Generally, the adapter connector 154 has the following properties:

- routes the necessary signals to/from the host connector 156, optionally including power;
- provides physical support for the adapter/mobile device assembly upon the host connector 156, and thereby upon the host device;
- provides easy joining of the adapter connector 154 to host connector 156, allowing for easy blind insertion of the adapter/mobile device assembly to the host device;
- optionally provides positive locking of the connectors 154 and 156 for protection from unintended slipping off.

Host connector 156 allows adapter 114, via connector 154, to be electrically and physically coupled to host device 150. Generally, host connector 156 has the following properties:

- provides an easy target for a user to attach the adapter/mobile device assembly onto host device 150, allowing for easy blind insertion of the adapter/mobile device assembly to the host device;
- provides interface to the electrical signals exposed by (and/or to be communicated to) the adapter/mobile device assembly;
- provides support and optional locking capability corresponding to the adapter connector 154.

Host device 150 can be any of a wide variety of devices. As discussed above, adapter 114 allows the mobile device to be electrically and physically coupled to numerous different host devices in numerous different environments. These environments include, for example, vehicles, home, work, retail locations, public facilities (e.g., kiosks), and so forth. In certain embodiments, host device 150 is easily removable from the environment in which it is placed. For example, host device may be designed to be plugged into a vehicle cigarette lighter adapter (or other power adapter) as illustrated in FIG. 4, and can be readily removed from a vehicle and placed in another.

Examples of host devices 150 include: a belt clip; a belt clip with a wired earbud; a car adapter with a combination of, for example, one or more of power, an FM modulator, a built-in speaker, a built-in noise/echo cancellation system, a wired audio output to an in-car stereo, an internal microphone, an external boom microphone, an external wired microphone, a GPS (Global Positioning System) device, a cigarette lighter power and mount, a heater vent mount, a cup-holder mount, etc.; a desktop speaker phone adapter with a combination of, for example, one or more of power, an internal microphone, a wireless microphone receiver, a built-in speaker, a built-in echo/noise cancellation system, a desktop chassis, etc.; a desktop stereo with a combination of, for example, one or more of power, a stereo power amplifier and speakers, volume control, bass control, treble control, etc.; and so forth.

Generally, host device 150 has the following properties: provides physical support of the host connector 156; accesses the electrical signals passed from the adapter/mobile device assembly via the connectors 154 and 156, and/or passes electrical signals to the adapter/mobile device assembly via the connectors 154 and 156;
optionally provides power to the adapter/mobile assembly via the connectors 154 and 156.

Figure 17:
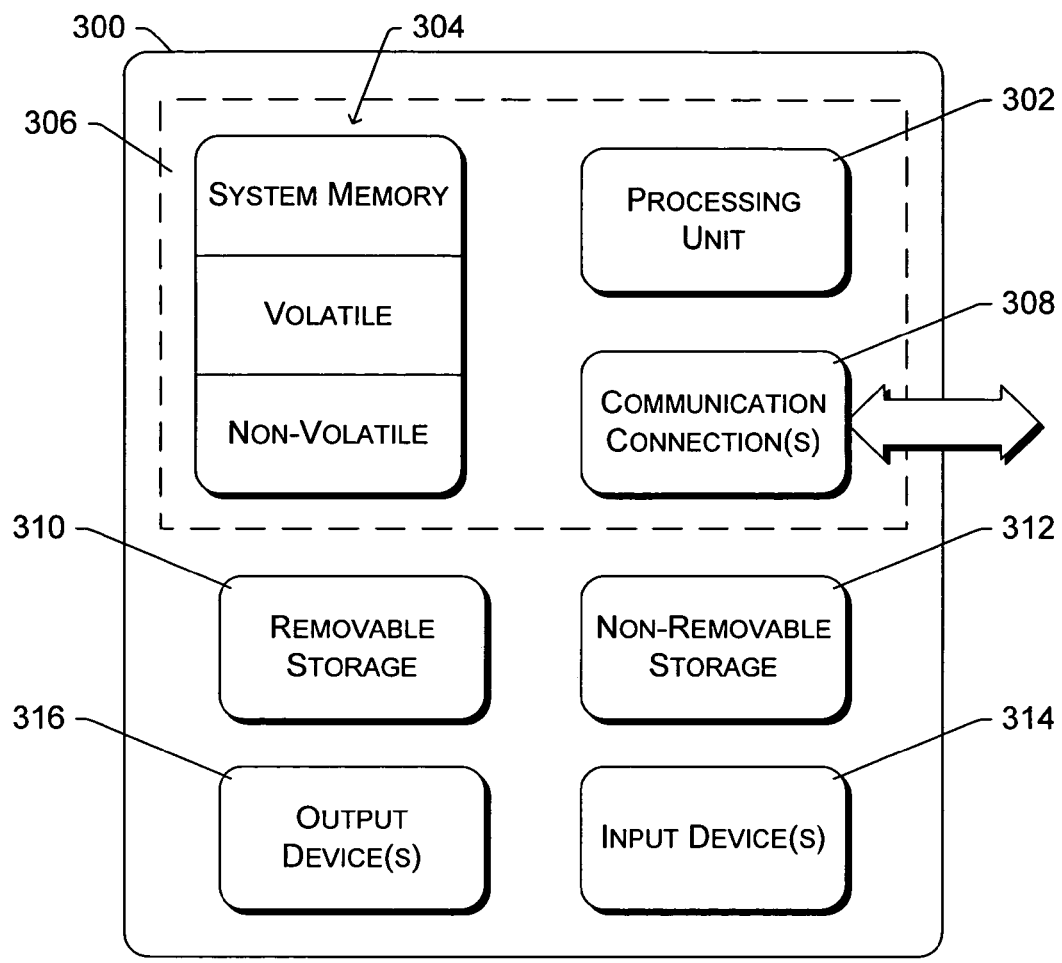
FIG. 17 illustrates an example general device.

FIG. 17 illustrates an example general device 300. Device 300 can be, for example, a mobile device (e.g., a device 102 as discussed above) or host device (e.g., a host device 150 as discussed above) as discussed herein. In a basic configuration, device 300 typically includes at least one processing unit 302 and memory 304. Depending on the exact configuration and type of device, memory 304 may be volatile (such as DRAM), non-volatile (such as ROM, flash memory, etc.) or some combination of the two. This basic configuration is illustrated in FIG. 17 by dashed line 306. Device 300 also typically includes communications connection(s) 308 that allow the device to communicate with other devices (e.g., to allow the electrical connection between the device 300 and adapter 114 of FIG. 2).

In certain embodiments, system memory 306 includes one or more instructions that are executed by processing unit 302 in order to provide the functionality (or at least some of the functionality) of device 300. In other embodiments, rather than having instructions that are executed by the processing unit, one or more hardware components (e.g., Application Specific Integrated Circuits (ASICs), Programmable Logic Devices (PLDs), Programmable Logic Arrays (PLAs), and so forth) may be designed to provide the functionality (or at least some of the functionality) of device 300.

Furthermore, device 300 may also have additional features/functionality. For example, device 300 may also include additional storage (removable and/or non-removable), such as magnetic or optical disks or tape. Such additional storage is illustrated in FIG. 17 by removable storage 310 and non-removable storage 312. Device 300 may also have input device(s) 314 such as one or more of a keyboard, mouse, pen, stylus, voice input device, touch input device, and so forth. Output device(s) 316 such as one or more of a display, speaker(s), printer, etc. may also be included.

Although the description above uses language that is specific to structural features and/or methodological acts, it is to be understood that the invention defined in the appended claims is not limited to the specific features or acts described. Rather, the specific features and acts are disclosed as example forms of implementing the invention.

The invention claimed is:

1. A system comprising:
an adapter designed to attach to a mobile device, the adapter having one or more electrical contacts to interface with one or more electrical contacts of the mobile device when the adapter is attached to the mobile device to allow information to be passed between the adapter and the mobile device, the adapter further having a connector portion that is electrically coupled to the one or more electrical contacts of the adapter;
a host device having a connector portion that is a mate to the connector portion of the adapter, wherein the connector portion of the host device has one or more electrical contacts to interface with one or more electrical contacts of the connector portion of the adapter when the adapter and host device are connected using the connector portions of the adapter and host device;
a latching mechanism that locks together the connector portions of the adapter and the host device,
wherein the adapter is designed to remain continually attached to the mobile device, including when the adapter is not attached to the host device.

2. A system as recited in claim 1, wherein the adapter comprises a glove.

3. A system as recited in claim 1, wherein the connector portions of the adapter and the host device together comprise a jack knife connector.

4. A system as recited in claim 1, wherein the connector portion of the adapter comprises a slot portion of a jack knife connector, and wherein the connector portion of the host device comprises a blade portion of the jack knife connector.

5. A system as recited in claim 1, wherein the latching mechanism comprises a spring-loaded ball and dimple mechanism.

6. A system as recited in claim 1, wherein the connector portion of the host device comprises a connector assembly made up of a housing, a connector sub-assembly that includes the one or more electrical contacts of the connector portion, and a plate holding the connector sub-assembly in place.

7. A system as recited in claim 1, wherein the connector portion of the adapter and the electrical contacts of the adapter are both part of a flex circuit mounted in the adapter.

8. A system as recited in claim 1, wherein the host device is designed to be removably coupled to a vehicle.

9. A system as recited in claim 8, wherein the host device is designed to be removably coupled to a cigarette lighter jack of the vehicle.

10. A system as recited in claim 1, further comprising a plurality of additional adapters each designed to attach to a different one of a plurality of different mobile devices, wherein each of the plurality of different mobile device designs has one or more electrical contacts in different configurations.

11. A system as recited in claim 1, wherein the mobile device comprises a cellular phone.

12. A system as recited in claim 1, wherein the adapter does not impede the operation of the mobile device.

13. A system as recited in claim 1, wherein the connector portion of the host device is standard across a plurality of host devices that are designed to be used in different environments.

14. An apparatus comprising:
- a first interface designed to be in communication with an interface of a mobile device when the apparatus is attached to the mobile device; and
- a single connector, coupled to the first interface, to allow the apparatus to be physically attached to and securely held by a plurality of different types of host devices, wherein the connector includes a second interface to place the first interface in communication with an interface of one of the plurality of host devices when the apparatus is physically attached to a host device.

15. An apparatus as recited in claim 14, wherein the first interface and the second interface comprise an electrical interface, wherein the first interface is designed to be in electrical contact with the interface of the mobile device, and wherein the second interface is to place the first interface in electrical contact with the interface of one of the plurality of host devices when the apparatus is physically attached to the one host device.

16. An apparatus as recited in claim 14, wherein the first interface and the second interface comprise an optical interface.

17. An apparatus as recited in claim 14, wherein the apparatus is designed to securely attach to a mobile device.

18. An apparatus as recited in claim 14, wherein the connector comprises a female jack knife connector.

19. An apparatus as recited in claim 14, wherein the apparatus is designed to remain continually attached to the mobile device, and wherein the apparatus does not impede the operation of the mobile device.

20. An apparatus as recited in claim 14, wherein the mobile device comprises a cellular phone.

21. An apparatus as recited in claim 14, further comprising a flex circuit that includes both the first interface and the second interface.

22. An apparatus comprising:
- a connector to hold an adapter when the adapter is physically attached to the apparatus, wherein the adapter can be physically attached to a mobile device; and
- one or more electrical contacts, situated on the connector and designed to be electrically coupled to one or more electrical contacts of the adapter when the adapter is physically attached to the apparatus;
- wherein the connector is standard across the apparatus and a plurality of additional apparatus that are designed to be used in different environments.

23. An apparatus as recited in claim 22, wherein the connector comprises a male jack knife connector.

24. An apparatus as recited in claim 22, wherein the apparatus comprises a connector assembly including a housing, a connector sub-assembly that includes the one or more electrical contacts, and a plate holding the connector sub-assembly in place.

25. An apparatus as recited in claim 22, wherein the mobile device comprises a cellular phone.

26. An apparatus as recited in claim 22, wherein the apparatus is designed to be removably coupled to a vehicle.

27. A system comprising:
- means for holding a mobile device, the means for holding having means for electrically interfacing with one or more electrical contacts of the mobile device when the means for holding is holding the mobile device;
- means for hosting the means for holding; and
- means for connecting the means for holding and the means for hosting, wherein the means for connecting places the means for holding and the means for hosting in electrical contact with one another, and wherein the means for connecting further securely attaches the means for holding to the means for hosting, and wherein the means for connecting comprises a jack knife connector;
- wherein the means for connecting is standard across a plurality of means for hosting, and wherein each of the means for hosting is designed to be used in different environments.

28. A system as recited in claim 27, wherein the means for holding further includes a slot of the jack knife connector, and wherein the means for hosting further includes a blade of the jack knife connector.

* * * * *